United States Patent
Zhang

(10) Patent No.: US 9,430,131 B1
(45) Date of Patent: Aug. 30, 2016

(54) SYSTEM, METHODS, AND USER INTERFACE FOR ORGANIZING UNSTRUCTURED DATA OBJECTS

(71) Applicant: Guangsheng Zhang, Palo Alto, CA (US)

(72) Inventor: Guangsheng Zhang, Palo Alto, CA (US)

( * ) Notice: Subject to any disclaimer, the term of this patent is extended or adjusted under 35 U.S.C. 154(b) by 220 days.

(21) Appl. No.: 14/225,422

(22) Filed: Mar. 25, 2014

Related U.S. Application Data

(60) Provisional application No. 61/809,893, filed on Apr. 9, 2013, provisional application No. 61/805,141, filed on Mar. 25, 2013.

(51) Int. Cl.
- *G06F 3/048* (2013.01)
- *G06F 3/0484* (2013.01)
- *G06F 3/0481* (2013.01)
- *G06F 17/30* (2006.01)

(52) U.S. Cl.
CPC ....... *G06F 3/04842* (2013.01); *G06F 3/04817* (2013.01); *G06F 17/3053* (2013.01)

(58) Field of Classification Search
None
See application file for complete search history.

(56) References Cited

U.S. PATENT DOCUMENTS

| | | | |
|---|---|---|---|
| 7,599,938 B1 * | 10/2009 | Harrison, Jr. | G06F 17/30867 705/12 |
| 8,370,129 B2 | 2/2013 | Zhang | |
| 8,407,217 B1 | 3/2013 | Zhang | |
| 2005/0234953 A1 * | 10/2005 | Zhang | G06F 17/30663 707/999.101 |
| 2006/0253438 A1 * | 11/2006 | Ren | G06F 17/30616 707/999.005 |
| 2008/0222140 A1 * | 9/2008 | Lagad | G06F 17/30864 707/999.005 |
| 2009/0024489 A1 * | 1/2009 | Baldua | G06Q 30/0609 705/26.35 |
| 2009/0063265 A1 * | 3/2009 | Nomula | G06F 17/30864 705/14.66 |
| 2009/0293017 A1 * | 11/2009 | Carter | G06F 3/0481 715/811 |
| 2010/0274815 A1 * | 10/2010 | Vanasco | G06F 17/30867 707/798 |
| 2011/0043652 A1 * | 2/2011 | King | G06F 17/2211 348/222.1 |
| 2011/0145164 A1 * | 6/2011 | Lavoie | G06Q 30/0282 705/36 R |
| 2015/0195220 A1 * | 7/2015 | Hawker | H04L 51/02 709/206 |

* cited by examiner

*Primary Examiner* — Hua Lu

(57) ABSTRACT

A system, methods, and user interface for organizing an unstructured collection of electronic objects in a list or group format are disclosed for more effectively locating and retrieving needed items from a large number of candidates. The electronic objects include various types of data objects, including files or folders or contacts. The methods include assigning importance measures to items in the collection based on various attributes associated with the objects. The attributes include metadata and attributes obtained from content analyzes of the objects, including a specific term, a term with a specific semantic attribute, a class of the object, and other attributes.

20 Claims, 13 Drawing Sheets

| Specify or confirm a relevance criterion: | |
|---|---|
| Contains the term: | Importance: |
| Proctor and Gamble | 0.95 |
| Walmart | 0.95 |
| Related to the region of: | Importance: |
| Boston | 0.8 |
| San Francisco | 0.4 |
| Related to the topic of: | Importance: |
| Enterprise Sales | 0.85 |
| Related to the category of: | Importance: |
| Marketing | 0.7 |
| Select examples: | Importance: |
| Article 1 | 0.9 |
| Message 2 | 0.9 |

Figure 2A

| Specify or confirm a relevance criterion: | |
|---|---|
| Contains the term: | Importance: |
| Proctor and Gamble | 0.95 |
| Walmart | 0.95 |
| Related to the region of: | Importance: |
| Boston | 0.8 |
| San Francisco | 0.4 |
| Related to the topic of: | Importance: |
| Enterprise Sales | 0.85 |
| Related to the category of: | Importance: |
| Marketing | 0.7 |
| Select examples: | Importance: |
| Article 1 | 0.9 |
| Message 2 | 0.9 |

Figure 2B

270 — Specify or confirm a relevance criterion:

271

| Relevance criterion: | Importance: | | |
|---|---|---|---|
| Boston | High ○ | normal ○ | low ○ |
| San Francisco | High ○ | normal ○ | low ○ |

| Relevance criterion: |
|---|
| Boston |
| San Francisco |

| Query Keywords: | Importance: |
|---|---|
| Hybrid cars | 1 |
| Electric cars | 0.8 |
| ... | ... |

Figure 6B

Specify requirements as search parameters:

| Qualification: | Requirement: | Importance: |
|---|---|---|
| Skill A | 3 years | 0.7 |
| Skill B | 4 years | 0.85 |
| ... | ... | ... |

Figure 9

| Sort by importance value | Contacts: |
|---|---|
| 5 | John Smith |
| 5 | Mary Jones |
| 4 | Jim Lee |
| 3 | Victor Wang |
| 2 | Jane Young |

Figure 10A

| Sort by importance value | File Folders: |
|---|---|
| 5 | ▢ Engineering |
| 5 | ▢ June Reports |
| 4 | ▢ Quality |
| 3 | ▢ Marketing |
| 2 | ▢ Finance |

Figure 10B

| Sort by importance value | Files: |
|---|---|
| 5 | ▢ Report draft |
| 5 | ▢ Project outline |
| 4 | ▢ White paper |
| 3 | ▢ Notes for next meeting |
| 2 | ▢ presentation |

Figure 11A

| importance value | Attributes: |
|---|---|
| 3 | Contains the word "project" |
| 5 | Accessed 10+ times |
| 4 | Accessed with last 10 days |
| 3 | Area code of "650" |
| 1 | Area code of "800" |

Figure 11B

File Folders:

- ☐ This folder contains links to the most frequently accessed files
- ☐ This folder contains files that have been accessed 5-10 times
- ☐ This folder contains links to the most important files (value: 4-5)
- ☐ This folder contains links to files with importance value: 2-3
- ☐ This folder contains links to files with importance value: 1
- ☐ Files accessed in the last 10 days
- ☐ Files accessed in the last 30 days
- ☐ Files/emails containing phone numbers
- ☐ Files/emails containing Web addresses

SYSTEM, METHODS, AND USER INTERFACE FOR ORGANIZING UNSTRUCTURED DATA OBJECTS

CROSS REFERENCE AND RELATED APPLICATIONS

The present application claims priority to U.S. Provisional Patent Application 61/809,893 entitled "System, Methods, and User Interface for Automatically Presenting Information Based on Relevance" filed on Apr. 9, 2013, and U.S. provisional patent application 61/805,141, entitled "System, Methods, and User Interface for Presenting Information Based on Document Contents", filed on Mar. 25, 2013, the disclosures of which are herein incorporated by reference.

BACKGROUND OF THE INVENTION

In the current state of the Big Data or information age, many people face the problem of information overload. While the human cognitive capacity of processing information in a given time period is limited, more and more information is made available or accessible to ordinary users. In one instance, social networks, including the version of social networks designed for enterprise or other organizations, constantly feed the user with news or updates. Especially in the enterprise environments, while certain information can play a critical role in more efficient collaboration, a side effect is that a user can be very much distracted by irrelevant information as each piece of data takes time and attention to discern its value. In another instance, email as a communication tool has the same nature as such "feeds", as incoming emails can constantly enter into a user's email box and requires constant attention, and in some cases, email has also evolved into a form of social network.

Furthermore, search engines can return hundreds or thousands of results, and can often mix what is relevant with what is not so relevant to the query. Meanwhile, the amount of personal data, such as files or folders or contacts or phone numbers, are also increasing day by day, and finding what is needed from a long list can be more and more difficult.

Products currently in the market only provide limited functionality in filtering irrelevant information. While such conventional methods can help reduce the amount of irrelevant information to a certain extent, more effective solutions to such problems are very much needed.

SUMMARY OF THE INVENTION

One solution to such a problem is to provide the user with information that is most likely to be relevant, and filtering out as much irrelevant information as possible.

Another solution to such a problem is to provide the user with methods for effectively organizing a large number of objects such as files, folders, emails, and contacts.

The present invention provides a system and methods for presenting relevant information to the user, and for organizing a large number of unstructured data objects.

In one aspect, methods for organizing an unstructured collection of electronic objects in a list or group format are provided for more effectively locating and retrieving needed items from a large number of candidates. The electronic objects include various types of data objects, including files or folders or contact list. The methods include assigning importance measures to items in the collection based on various attributes associated with the objects. The attributes include metadata and attributes obtained from content analyses of the objects, including a specific term, a term with a specific semantic attribute, a class of the objects, and other attributes.

In another general aspect, once a user is identified, message objects, or information objects, such as items in a feed or emails, are analyzed to determine a relevance measure related to the user. Message objects of different relevance measures are then divided into different groups, and displayed to the user in different but concurrently viewable areas or in different visual formats to distinguish more relevant objects from less relevant object while minimizing the chances of missing a relevant object.

Various methods of determining the relevance measures are disclosed. In one embodiment, items representing relevance criteria, such as terms, values, topics, classes, etc., are defined by the user, and the user can specify an importance measure for each of such items. The system of the present invention can determine the relevance measure of a message object based on the user specification.

In another embodiment, items representing relevance criteria, such as terms, values, topics, classes, etc., are identified from message objects by the system, and are presented to the user; and the user can specify an importance measure for such items. The system can determine the relevance measure of a message object based on the user specification.

In another embodiment, methods are provided for the user to specify an importance measure of a term in a search query, and the relevance of the search results can be determined based on the user specification. Furthermore, the search results can be displayed in different formats based on the relevance.

BRIEF ILLUSTRATION OF FIGURES

FIG. 1 shows an exemplar system diagram illustrating the functional components and procedures implemented on a computing system in accordance with the present invention.

FIGS. 2A, 2B, and 2C illustrate exemplar user interfaces for the user to specify a relevance criterion and an importance score associated with the relevance criterion.

FIG. 6A shows an exemplar user interface for specifying an importance value for a search term.

FIG. 6B shows an exemplar user interface for specifying an importance value for a search parameter when performing a resume search.

FIG. 9 shows an exemplar user interface for sorting a user's contact list on a social network, or a computer or phone by importance values.

FIG. 10A shows an exemplar user interface for sorting a user's folders by importance values.

FIG. 10B shows an exemplar user interface for sorting a user's files by importance values.

FIG. 11A shows an exemplar user interface for determining an importance measure for an object associated with a specific attribute.

FIG. 11B shows an exemplar user interface for re-arranging the files or folder by importance as an alternative way to the conventional method of browsing the file/folder structure by folder names.

DETAILED DESCRIPTION OF THE INVENTION

In one embodiment, the present invention applies relevance checking methods to information-intensive environments such as the enterprise social network, emails and chat streams, as well as to social networks for other purposes.

A common feature of various kinds of social networks is what is known as "news feeds", or a "stream" of certain type, such as an activity stream, etc. In such a form, information about other users' activities or updates can constantly be sent and displayed to the user. When a user has a large number of connections, the amount of information from such feeds can be overwhelming. In an enterprise environment, a user needs to focus on certain tasks, and a large amount of irrelevant information can critically impair the productivity.

A similar case occurs with emails.

The present invention provides a solution to such a problem by performing a content analysis to determine the relevance of information-carrying content, and by presenting such information in different visual formats that separate content with higher relevance from contents with lower relevance. Furthermore, the present invention also provides a method for users to specify a degree of relevance or importance for objects with certain attributes, and display the related information with different formats or different display areas.

The information-carrying content such as a message object in a feed or an email can be called a message object or an information object in general. A message object in such environments usually contains textual content, including words or phrases, or other units of text, which can all be called as "terms" in general, or interchangeably be used with what is commonly known as "keywords", or "key phrase", etc. For example, a message object may contain text describing a recent activity of the user, such as travel, restaurant visits, the name of a project the user is working on, or the name of a customer the user has talked to, any other information.

Figure 1:
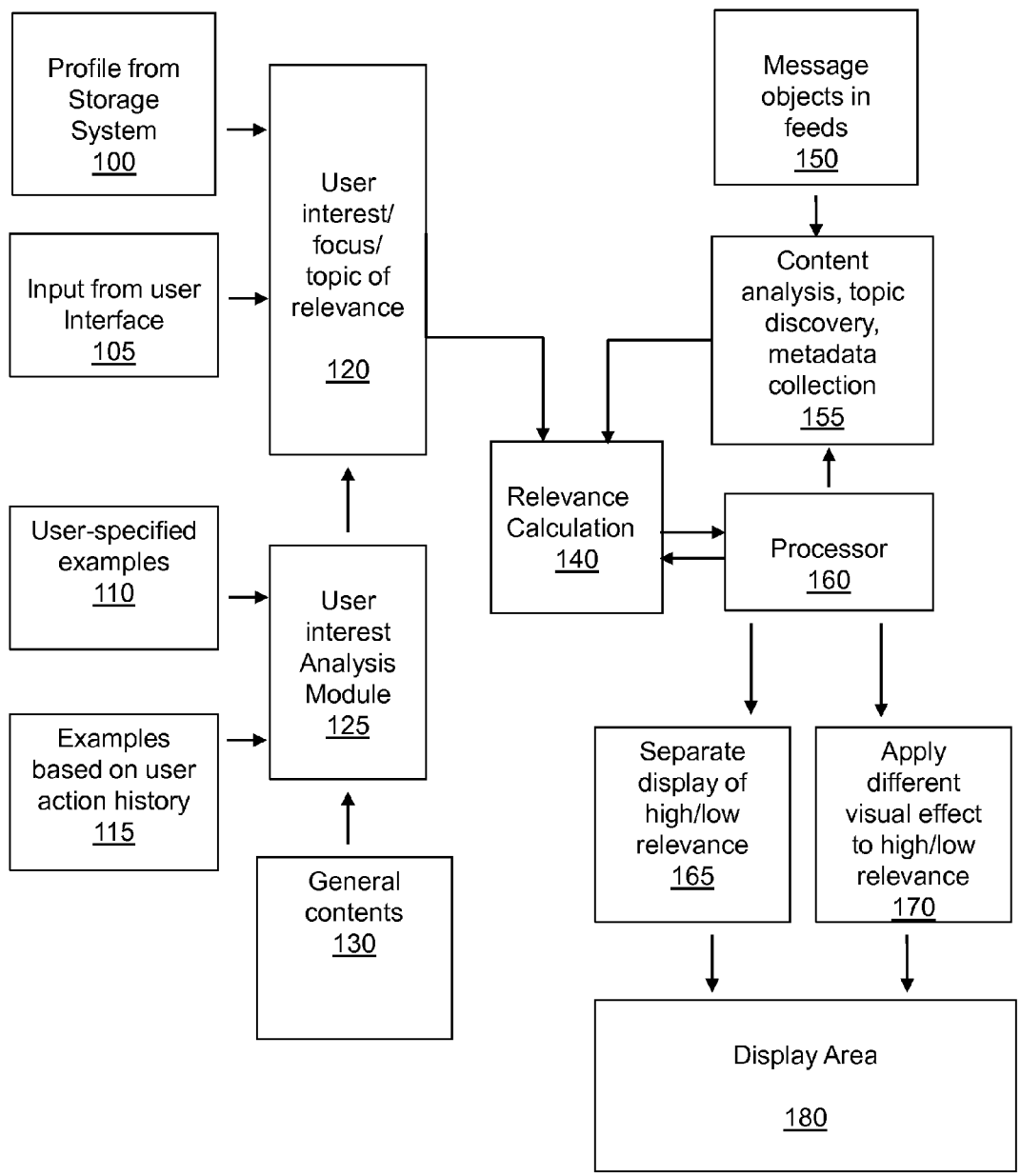

FIG. 1 is an exemplar system diagram illustrating the functional components and procedures implemented on a computing system in accordance with the present invention.

In FIG. 1, user interest or user's current attention focus or other topics of relevance (120) is first identified. The information can be obtained from a user profile stored in a computer storage system (100), or from a user interface as specified by the user (105), or from a user interest analysis module (125), which determines the estimated user interest using data either from user-specified example message contents (110), or from example message contents collected by the system based on user's action history (115), or from message contents in general (130).

Then, message objects in the data feeds (150) are analyzed for topic discovery and metadata collection (155). The topics discovered from the message object contents are compared with the user interest or topic of relevance by the relevance calculation module (140), together with a computer processor (160). When the relevance of the message objects are determined, high relevance message objects and low relevance message objects are distinguished, and are marked either for display in separate display areas (165), or for display in different visual effects (170) such as size, shape, color, etc. Finally, the message objects are displayed in the information feed (180).

In some embodiments, the text content in the message object is extracted and analyzed, as in (155). Each term in the content can be analyzed to determine a term importance score to indicate how much the term can represent a topic of the content, or how important a term is in representing the content.

In some embodiments, a term importance score is calculated based on various attributes of the term in the content, or in multiple message objects.

In U.S. Pat. No. 8,407,214 entitled "Automatic Topic Discovery in Documents", by the present inventor, various methods are disclosed for determining a term importance score and for discovering topic terms in various text contents, based on grammatical and distributional attributes of the terms in the content. The disclosure of this patent is herein incorporated by reference.

In U.S. patent application Ser. No. 13/707,940 entitled "Automatic Topic Discovery in Documents and Content Categorization", more methods are disclosed for determining the degree of importance of a term in a text content in terms of representing the topics or concept conveyed in the text content, based on the grammatical and semantic attributes associated with the terms. The methods disclosed in this application are herein incorporated by reference.

In U.S. patent application Ser. No. 13/802,427 entitled "System, Methods, and Data Structure for Machine-Learning of Contextualized Symbolic Associations" filed by the present inventor on Mar. 13, 2013, methods for using more contextual attributes are disclosed. The methods further include assigning a weighting co-efficient to a term based on its position in the text content, or its position relative to a specific term, or the distance of the term from a specific term, in addition to using the grammatical or semantic contextual information. These methods can also be used for determining the term importance score of the terms in the text content. The methods disclosed in this application are herein incorporated by reference.

In the referenced disclosures, in addition to the grammatical or semantic attributes, the attributes used in determining the term importance measure can also include attributes such as frequency of occurrence of the term in the message objects, position of a term in the message object, such as the position of a term in a sentence, or in a paragraph, or the position of the sentence in a paragraph or on the entire message object, etc. More contextual information can also be used to include attributes such as whether a term is within a certain distance before or after a specific term with specific attribute, etc.

The same methods in the referenced disclosure can be applied to the text content in the message objects in the present invention, and the term importance score can be used as an indication of the likelihood of the term in representing the topics of the content.

Furthermore, as in (105), the present invention provides various methods for the user to indicate his interest, or his current focus, or a topic of relevance for filtering the information presented in the feed, or for determining the relevance of a message object in the feed.

In some embodiments, the method for the user to indicate his interest or focus or topic of relevance is to allow the user to enter a keyword or a description of the user's interest or topic of relevance. For example, in an enterprise environment, the user can enter keywords such as "project A", "location B", or "customer C", etc. The system of the present invention can then match such keywords with the terms in the message objects, and calculating a term importance score of a matched term in the message object as a quantitative measure of the term in representing a topic of the message, and use this score as a relevance score in determining how relevant the message object is to the user based on the user's indication. The same method can also be applied to non-enterprise environments.

In some embodiments, the method for the user to indicate the user's interest or focus or topic of relevance is to allow the user to specify a few example message objects as being relevant, such as in (110), and the system of the present invention can analyze the contents of such message objects using a method described above with the referenced disclosures, and identify one or more terms in the contents as representing certain topics of the message objects, and also store such terms in a user-related document such as a user profile, as in (100). The system can then match such extracted or stored terms with the terms in other message objects, and calculating a term importance score of a matched term in the message object as a quantitative measure of the term in representing a topic of the message, and use this score as a relevance score in determining how relevant the message object is to the user based on the user's example message objects.

In some embodiments, additional methods are provided for the user to indicate a degree of relevance for a specific keyword, or a specific example objects. For example, a user interface object or objects, such as text boxes or buttons or sliders can be provided for the user to specify that the keyword "project A" is of primary relevance, and "project B" is of secondary relevance, etc.; or example A is of primary relevance, and example B is of secondary relevance, etc. In some embodiments, a binary or non-binary numerical value can be specified by the user to be associated with such keywords or example objects, either by entering the value, or by selecting a value from a list, and such values can be used as a parameter when determining the relevance of the message objects. In some embodiments, when the user indicates the importance measure in the form of a text description, or a user interface object selection such as selecting a button, etc., a numerical value can be predetermined corresponding to the text or user interface object selection, or transformed from such text or UI object selection.

In some embodiments, the system of the present invention can automatically identify certain message objects that the user has viewed or acted within a given period of time, without requiring the user to specify example message objects, such as in (115); and analyze the contents of such message objects using a method described above with the referenced disclosures. The system can identify one or more terms in the contents as representing certain topics of the message objects, and also store such terms in a user-related document such as a user profile, based on the assumption that the message objects that the user has recently viewed or acted on have a higher likelihood of being relevant to the user. The system can then match such extracted or stored terms with the terms in other message objects, and calculating a term importance score of a matched term in the message object as a quantitative measure of the term in representing a topic of the message, and produce a relevance score based on this score in determining how relevant the message object is to the user.

In some embodiments, the system of the present invention can automatically identify certain message objects, whether they have been viewed or acted on by the user or not, and analyze the contents of such message objects using a method described above with the referenced disclosures, such as in (130).

The system can identify one or more terms in the contents as representing certain topics of the message objects, and present such terms to the user as suggestions. The user can select one or more presented terms as indication of user's interest or topic or relevance, and the system can store such terms in a user-related document such as a user profile. The system can then match such user-selected terms with the terms in other message objects, and calculating a term importance score of a matched term in the message object as a quantitative measure of the term in representing a topic of the message, and produce a relevance score based on this score in determining how relevant the message object is to the user. In such embodiments, the user does not need to come up with a keyword to specify his or her interest or topic of relevance, the user can simply select one or more keywords from the list. This method can make the user's job much easier. In some embodiments, one or more user interface objects and options can also be used when presenting suggestions to the user, such that the user can specify an importance factor for a suggested term.

Using Metadata for Determining Relevance

In some embodiments, in addition to or instead of performing a content analysis as described above, the present invention can collect different types of metadata or properties of the message objects, as in (155), and present such metadata to the user for selection. For example, metadata or properties or attributes of message objects such as the name of the person who has an update or activity, or the name of a project being worked on by a colleague, or the name of a group of people sharing a specific attribute, or the name of the person who created the message object, or the location of the person or a customer, etc., can be collected and presented to the user, and the user can indicate which properties or metadata are associated with message objects that are of interest or relevance to him.

In some embodiments, as described above, the user can indicate a degree of relevance or importance for a piece of metadata or property, such as message object related to the update or activities of person A is of higher relevance than that related to person B, etc. In some embodiments, a binary or non-binary numerical value can be specified to be associated with such metadata, either by entering the value, or by selecting a value from a list, or acting on a user interface object corresponding to a value. And the system can selectively display in the feed those message objects that are of higher relevance, and hide those that are of lower relevance, or display high-relevance objects in a different way from those that are of low relevance. Such information based on metadata or properties of the message objects can be presented in a list format, or in other formats.

Concept-Based Topic or Category Discovery and Relevance Determination

In some embodiment, the relevance can also be determined using a method based on conceptual association data.

In U.S. Pat. No. 8,370,129 entitled "System and Methods for Quantitative Assessment of Information in Natural Language Contents", and U.S. patent application Ser. No. 13/655,415 entitled "System And Methods For Determining Relevance Between Text Contents", and U.S. patent application Ser. No. 13/732,374 entitled "System And Methods For Quantitative Assessment Of Information In Natural Language Contents And For Determining Relevance Using Association Data", by the present inventor, system and methods are disclosed for conceptually determining the relevance between text contents. The disclosure of which is herein incorporated by reference. The methods can be used for the present purpose of determining the relevance of the message objects in relation to the user's interest or focus or topic of relevance.

In some embodiments, the user can specify a concept or category or class name as a relevant topic for information display. The system of the present invention can obtain a dataset representing an associative definition of the concept, as described in the referenced disclosures; and automatically identify whether a message object is conceptually relevant to the user's interest, or to the specified concept or category or class, even though the message objects may not contain the exact term that matches the concept or category name. For example, if the user specifies the concept name of "travel" as a topic of relevance, and in the information feeds or emails, certain message objects contain information related to activities such as "car rental", "hotel booking", etc., in such cases, the system of the present invention can apply the concept-based methods to detect that the message objects are relevant to the user's specified interest or topic of relevance of "travel".

In some embodiments, when the user specifies one or more keywords or a description of relevant topic or focus, the keywords or description contents can be mapped to a concept definition, and the message object can also be mapped to a concept definition. If the concept matches, the degree of relevance between the user-specified keywords or description and the message objects can be determined, and the results can be displayed accordingly. For example, if the user specifies the keyword of "car rental" as a topic of relevance, and in the information feeds, certain message objects contain information related to activities such as "travel expense", etc., in such cases, the system of the present invention can apply the concept-based methods to detect that both the user specified keyword of "car rental" and the message objects can be mapped to the concept of "travel", and that the message object is relevant to the user's specified interest or topic of relevance of "car rental".

In some embodiments, when the user specifies a few example message objects representing a relevant topic or focus, the system of the present invention can first identify the relevance of the example message objects to one or more candidate concepts or category or class, and the non-example message objects can also be mapped to a concept or category or class definition. If they match, the degree of relevance between the user-specified examples and the non-example message objects can be determined, and the results can be displayed accordingly.

Furthermore, in some other embodiments, when the system obtains message objects without the user specifying which objects as examples, the concept-based relevance method can be used in the same way as in the case when the user specifies example message objects. In such cases, the system can first present to the user a list of concepts identified as being associated with the message objects in the environment for information feeds, and let the user select which concepts or categories or classes are of relevance. Using this information, the system can then identify the degree of relevance between the message objects and one or more concepts that the user has selected, and the results can be displayed accordingly.

As described above, an importance measure can be specified for each concept or category or class when determining the relevance of a non-example message object.

In general, for determining a relevance score of a message object, a user can specify an item as a relevance criterion, and can further specify an importance measure for the item. The item as a relevance criterion can include a term or a keyword, or term representing a topic of interest, or a piece of metadata or attribute or property associated with the object, or a class or category that an message object may belong to or is a member of, or an example message object. Furthermore, the importance measure can be specified in the form of a text description, a binary or non-binary numerical value, or a selection of a user interface object corresponding to a predefined importance value.

FIGS. 2A, 2B, and 2C illustrate exemplar user interfaces for the user to specify a relevance criterion and an importance score associated with a relevance criterion.

In FIG. 2A, a user can specify a relevance criterion or confirm a relevance criterion automatically suggested by the system (205). The criteria can include different attributes (210, 220, 230, 240, 250), and the relevance criterion can be a term (211) to be matched with a term in a message object; or a piece of metadata (221) representing an attribute or property associated with the message object; or a topic of interest (231); or a category or class (241); or an example message object (251). Furthermore, an importance measure in the form of a numerical value (260) can be specified for each of the relevance criteria.

In FIG. 2B, an importance measure in the form of a button (280) can be specified for each of the relevance criteria (270, 271), and the button selected by the user can be transformed into a value.

In FIG. 2C, a button (290) associated with a relevance criterion (292) can be acted on, and an importance measure can be specified by selecting a value from a list of values (291).

Display Message Objects Using Different Visual Effects for Different Levels of Relevance Once the relevance of the message objects in relation to the user's interest or focus can be determined, the message objects can be displayed in a way that can further help the user to more effectively utilize the information presented to him in a format like feeds or streams or emails, and avoid distraction of irrelevant information while also minimizing the chance of missing relevant information.

As is the case with most of the automatic systems for such purposes, sometimes, some relevant information can be treated as less relevant by a system that uses automatic determination methods. To minimize the chances of missing relevant information while also minimizing the chances of presenting irrelevant information to the user, a solution provided by the present invention is to use separate display areas or different display formats or different visual effects when displaying message objects determined by the system as having different degrees of relevance to the user's interest or focus.

In some embodiments, message objects can be displayed in two or more separate display areas based on the relevance score, or based on whether their relevance scores are above or below or at a predefined threshold. In one embodiment, message objects with higher relevance scores are displayed in one area; and message objects with lower relevance scores are displayed in a second area, and the message objects and the different display areas are concurrently visible to the user.

Figure 3:
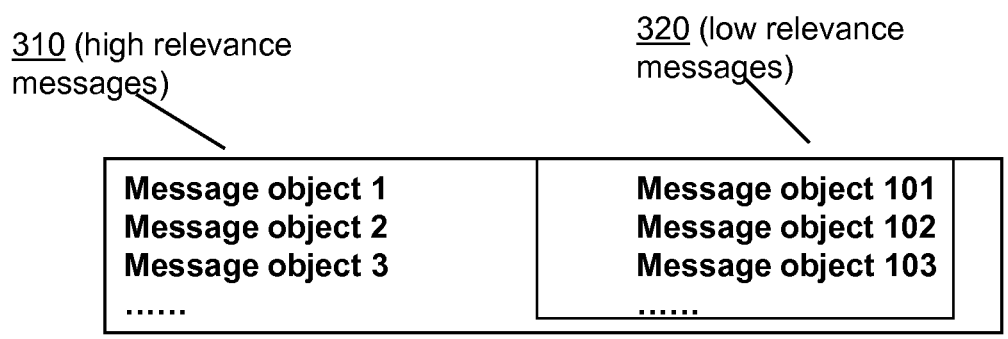
FIG. 3 illustrates an exemplar display format of the present invention.

FIG. 3 illustrates an exemplar display of the present invention. In FIG. 3, high-relevance message objects are displayed in a separate area (310) from low-relevance message objects (320).

In some embodiments, when the message objects are displayed in two or more separate display areas, the position, or the size, or the color, etc., of the display areas can be different based on the relevance scores or their estimates.

Figure 4:
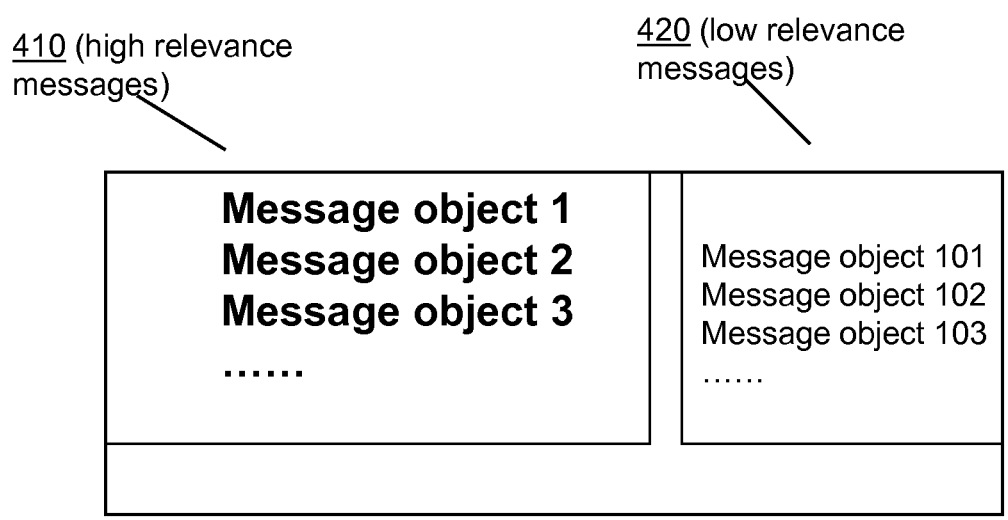
FIG. 4 illustrates an exemplar case in which message objects with higher relevance scores are displayed in a larger area than message objects with lower relevance scores.

FIG. 4 illustrates an exemplar case in which the message objects with higher relevance scores are displayed in a larger area to catch the user's main attention and for easy access; and message objects with lower relevance scores can be displayed in a smaller area for secondary degree of attention but are still available and accessible. In FIG. 4, the main display area (410) occupies about ⅔ of the total display area, while the secondary display area (420) occupies about ⅓ of the total display area.

In some embodiments, the size of the areas can be adjusted by the user as needed. User interface objects can be provided or user interface functionalities can be enabled for users to make adjustments to meet their individual needs.

In some embodiments, the position, or the color or shape of the areas can also be adjusted by the user as needed. User interface objects can be provided or user interface functionalities can be enabled for users to make adjustments to meet their individual needs.

In some embodiments, message objects of different degrees of relevance can also be displayed with different visual effects to indicate their degree of relevance. For example, message objects with higher relevance scores or estimates can be displayed in a special color, or size, or shape, or other visual effect to catch the user's main attention and to provide for easy access; and message objects with lower relevance scores can be displayed in a different format or with a different visual effect for secondary degree of attention but are still available and accessible. For another example, message objects with lower relevance scores can be displayed in a more condensed or brief format for quick glancing or browsing, and more information can be further displayed when the user acts on such message objects. A special case of the condensed or brief format can be a user interface object functioning as a switch or access point, such that the message objects of different relevance measures can be displayed or hidden when the user acts on the object.

Figure 5:
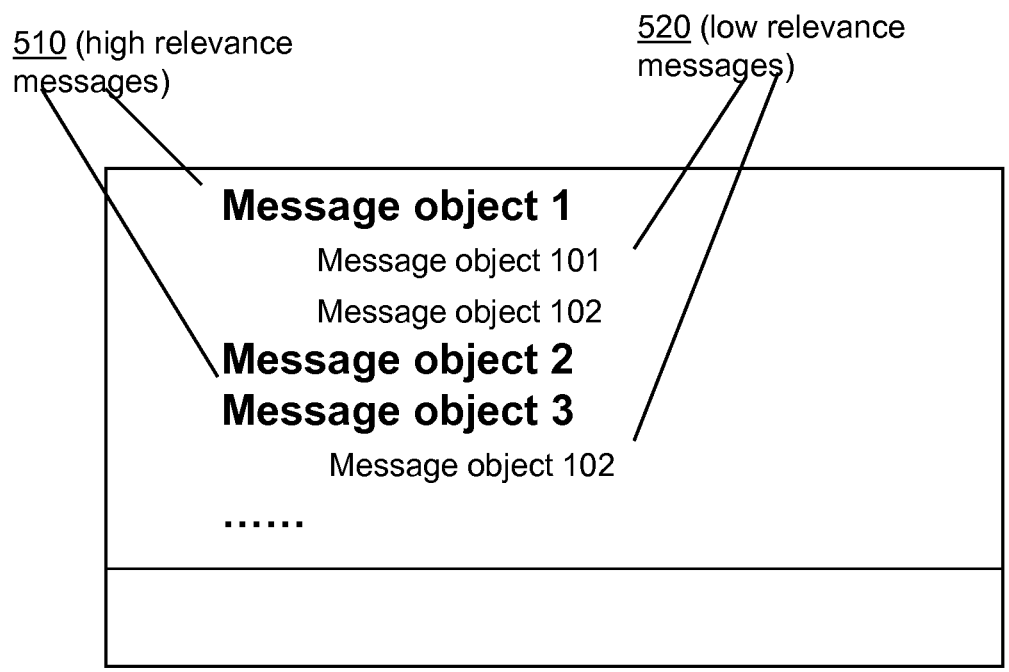
FIG. 5 illustrates an exemplar case in which message objects with higher relevance scores are displayed in a larger font size than message objects with lower relevance scores.

FIG. 5 illustrates an exemplar case in which the message objects with higher relevance scores are displayed in a larger font size to catch the user's main attention and for easy access (510); and message objects with lower relevance scores can be displayed in a smaller font size for secondary degree of attention but are still available and accessible (520).

Similarly, user interface objects can be provided or user interface functionalities can be enabled for users to make adjustments in the visual format for different degrees of relevance to meet their individual needs.

In some embodiments, the relevance scores are also displayed in association with each message object, thus the user can have an idea how relevant a message object is, whether it is in the same or a different display area.

In some embodiments, the threshold value of the relevance score for dividing the message objects into different groups for displaying in different areas or in different visual formats can also be displayed to give the user an idea how the message objects are divided into different groups for different display.

In some embodiments, the threshold value can be modified by the user, and accordingly, the message objects can be re-arranged into different groups for different display methods.

The system and methods of the present invention as described above are not limited to the information feeds in group communication or collaboration tools, or in social networks, nor limited to the search results or emails. The system and methods of the present invention can also be applied to other information systems in general, especially where users are faced with a large amount of messages or information carrying contents, as a solution to the problem of information overload. For example, other news feed or subscription services can benefit from the present invention by presenting the contents in different visual formats based on the relevance, and online advertising services can also use the methods of displaying more relevant and less relevant advertisements in different ways to achieve better economic results, as well as improving user experiences of the targeted users. For example, when the system can determine that certain advertisements are of higher relevance while others are of lower relevance, the area for display and the format or visual effect for display can be adjusted accordingly, such that while the advertiser can be properly served, the end user's user experience can also be enhanced or at least less affected. Furthermore, the methods of the present invention can be applied to various types of information feeds on mobile or handheld devices such as smartphones or tablet computing devices to display various types of information to the user in a more manageable way as described above. Such information can include educational, personal or public health, traffic, weather, news, and various other types of information that are pushed or presented to the user, but can be displayed in different formats or effects based on the relevance of the information to the user.

In some embodiments, the present invention can be applied to a recommending system. When an item, such as a topic or a category for news, a product or service, etc., are being recommended to a user on a social media or on a computing or communication device, additional user interface objects can be provided to allow the user to specify a degree of relevance of the recommended item, such that, in the future, more relevant items can be presented to the user more often, and less relevant items can be presented less often, in contrast to the conventional binary method of either to present or not to present.

Specifying Importance Measures for Search Terms

The present invention of specifying a degree of importance for a relevance criterion, and displaying results in separate areas or in different visual effects based on the relevance can also be applied to general-purpose search.

In the search products currently in the market, whether it is an Internet search engine, or an enterprise search engine, or a personal computer search engine, the search results are commonly displayed in the form of a list, presumably ranked by relevance score calculated using certain methods.

Such search engines can often return hundreds or thousands or even millions of results for a single query, while users may only have the time or patience to look at a few that are placed at the top of the list. This is another instance of the information overload problem faced by many users. Depending on the relevance ranking algorithm, certain high-relevance results can sometimes be treated as low-relevance results, and vice versa, and users will have to make extra effort to access the next pages in the list in order to find the truly relevant information. Often, if a user does not have enough time or patience, the user may just stop at the first page, thus missing what could be the truly relevant or the needed information that may be listed in the next pages.

As a solution to such a problem, in some embodiments of the present invention, like in the case of the information feeds described above, the search results can be displayed in multiple areas on the same page, such as two areas, with one for high-relevance results, and one for low-relevance results, the same way as is illustrated in FIGS. 3, 4, and 5 for information feeds. Thus, users can take a glance at both areas without spending the efforts in further accessing additional pages. Furthermore, the size, position, and shape or color, etc., of the display area or of the items in results can also be different based on the relevance score, such that the high-relevance area can receive the main attention of the user, while the low-relevance area can receive secondary attention, but still be accessible with ease. For example, the top ten items in a search result can be displayed in the main area, while the next ten or twenty items can be displayed in a smaller area, or in smaller font size, or in a different color, to show that they may be of lower relevance, but can be readily accessed without the user making extra efforts in going to the next pages. Similarly, a user interface object can be provided to allow the user to specify or modify the relevance score threshold to control the division of high-relevance results from low-relevance results for concurrent display but in different formats.

Furthermore, the user of a search system can also specify the degree of relevance for certain attributes associated with the query. For example, a keyword in the query can be associated with a numerical value to indicate its importance in determining the relevance of the search result. For example, a user can search with the keywords of "hybrid cars" and "electric cars", and can also specify that the term "hybrid cars" is of an importance value of 1 on a 0 to 1 scale, and the term "electric cars" is of an importance value of 0.8, etc.

FIG. 6A shows an exemplar user interface for specifying an importance value for a search term. In FIG. 6, a search term (610) and have an importance value (620) specified for determining the relevance of search results.

In addition to a keyword in a query, certain other search parameters can also be associated with a value indicating a degree of importance as specified by the user, for determining the relevance of search results, and its display format.

For example, when searching for a hotel room, conventional search systems usually offer search parameters such as prices range, date range, location, as well as other parameters such as amenities, etc. With the conventional approach, these parameters take binary values, meaning they are either present or absent, or the condition is either satisfied or not satisfied, and the search results are filtered by the presence or absence of such parameters. In contrast, in the present invention, such parameters can take an additional value to indicate the user-specified degree of relevance.

For example, a user may specify that the price range between $100 and $200 is of higher importance than the date range between Tuesday and Thursday, or vice versa, or certain amenities are of higher importance than others. For example, the user can specify that whether the hotel has a swimming pool is of an importance score 0.5 on a 0 to 1 scale, or "medium" among the choices of "high", "medium", "low" for importance, such that, a hotel that does not have a swimming pool can still be listed in the search results, whether the result is displayed in one display area, or separate display area, or with different visual formats as described above. This way, the search results can serve the user better than the conventional results which are based on either the presence or absence of a selected feature or parameter.

The method of the present invention can be applied to many other use cases when search is performed.

For example, in resume search, a candidate's skill, or the years of experience for a specific skill, can have an importance score specified by the user when performing a search as an added feature to conventional search that only uses keywords in the query.

The use of a score like this to represent the fuzzy nature of unstructured data can overcome the disadvantages in exact-match-based search.

For example, an employer may require a job candidate to have a minimum of three years of experience in a specific skill or area. If in the resume database, candidates' years of experience is specified by increments in years, then a candidate with two and half years of experience may be filtered out and will not be in the search results. However, it is possible that the candidate's strength in other areas may compensate for the half year's short of experience in that area. With conventional search approaches, such a candidate can be filtered out or missed. In the present invention, user interface objects are provided to let the user of the search system specify how important this criterion is, for example, to specify a value on a 0 to 1 scale, and the system can calculate the relevance of the search results accordingly. For example, if the user specifies a value of 0.7, then, a job candidate with two and half years of experience in that area can still be considered as meeting the requirement, and can be presented in the search results. And accordingly, the search results can be displayed in separate areas to reflect the strength of the candidate based on the score.

FIG. 6B shows an exemplar user interface for specifying an importance value for a search parameter when performing a resume search. Users can specify a skill name (630) such as "Skill A", an additional requirement associated with the skill (640) such as "three years of experience", and an importance or relevance value (650) such as 0.7 associated with the skill as well as its additional requirements. The system can check with the resume database or index, and calculate a relevance score for the parameter of "three years of experience", which, in some embodiments, can result in an effective value of "2.1 years", thus a candidate with 2.5 years of experience in that area can still be presented, based on the assumption that the employer is willing to consider such a candidate, and optionally, the result can be displayed in a different area or format to indicate the special case.

Figure 7:
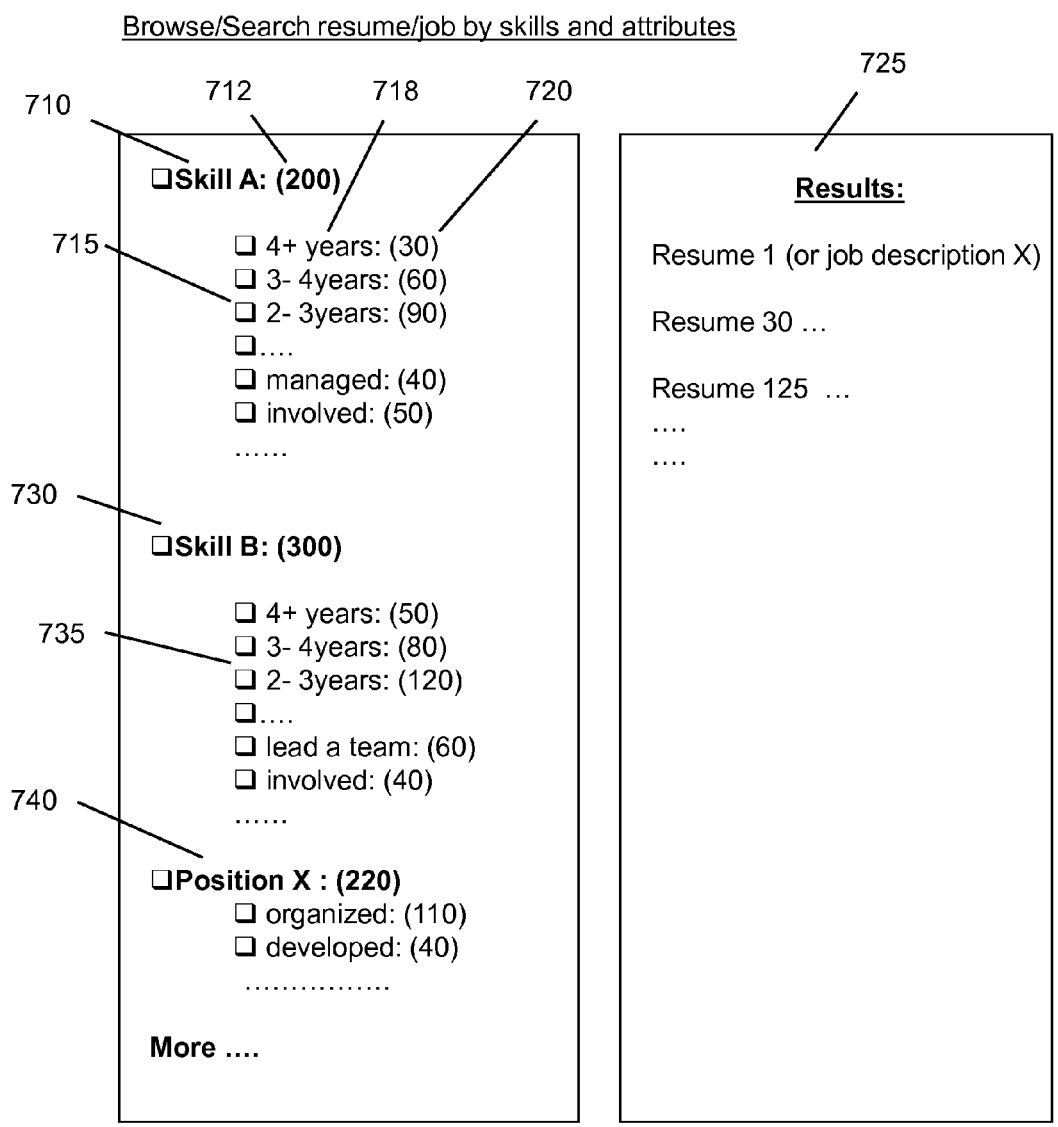
FIG. 7 is an exemplar user interface displaying a browsable search index or database with important topics displayed together with associated information in a format of a hierarchical structure.
Figure 8:
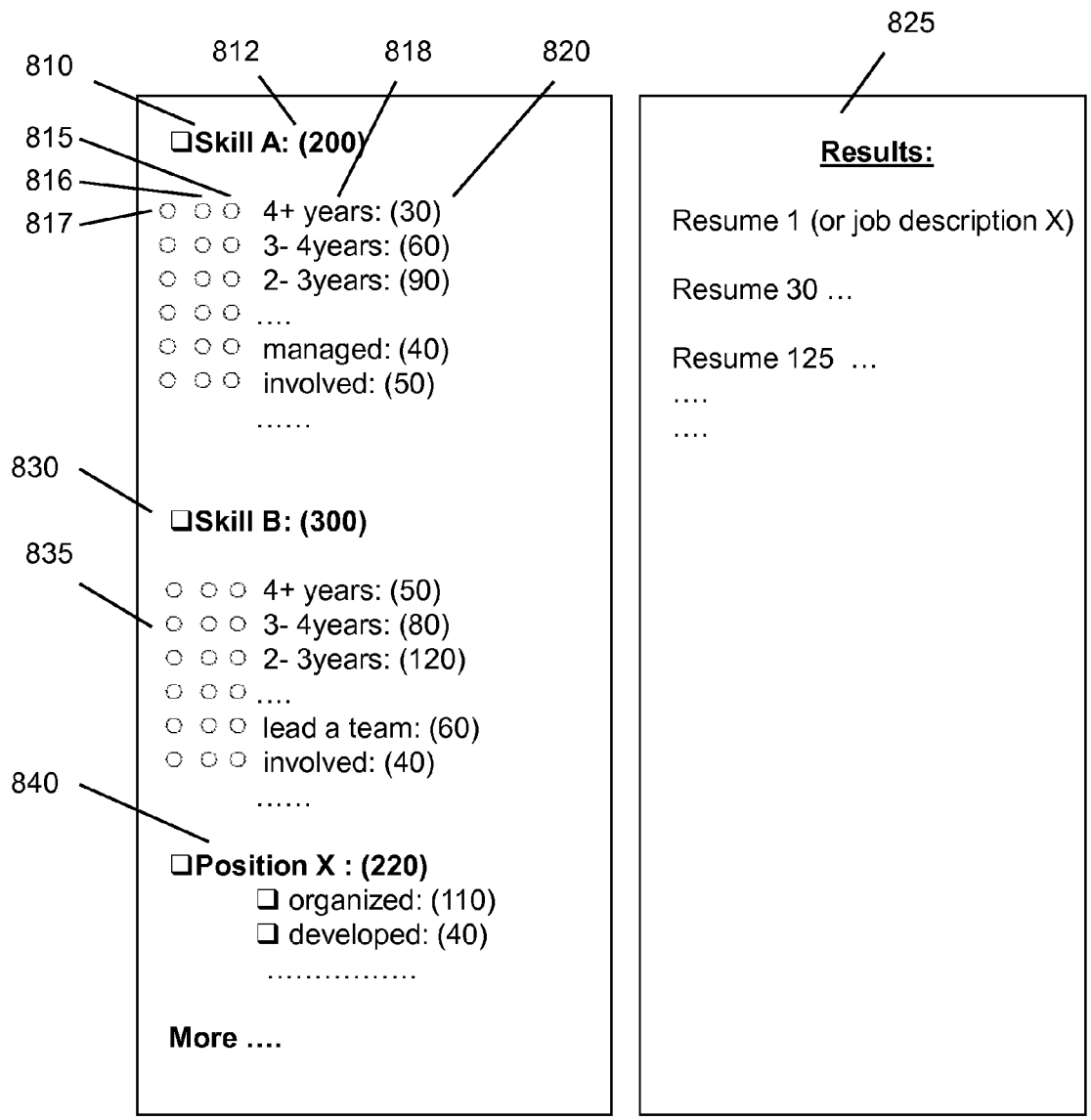
FIG. 8 is an expanded version of the system illustrated in FIG. 7.

FIG. 7 and FIG. 8 show additional embodiments of specifying the degree of importance when searching a resume repository or database.

FIG. 7 is an exemplar user interface displaying a browsable search index or database with important topics displayed together with associated information in a format of a hierarchical structure. In FIG. 7, domain-specific topics of importance, such as names of skills (710, 730, and 740) in a particular domain, are first identified and displayed in the user interface. The number of resumes or document instances or job descriptions containing such skill names are also displayed (712). When the user acts on a skill name, such as clicking or touching on a touch screen, initial results are displayed (725), without the user writing a query to initiate a search. Furthermore, additional information or attributes (718) associated with the selected skill name are also displayed, in a format that is like a tree or hierarchical structure; and the number of resumes or document instances or job descriptions associated with the corresponding attributes are also displayed (720). Furthermore, selectable objects, such as check boxes or radio buttons (715, 735) are provided, in association with the additional information or attributes as shown in 718. When the user further acts on the selectable objects (725, or 735), search results (725) can be dynamically updated to display only the resumes or document instances or job descriptions that are associated with the selected attributes. As is described above, the additional information or attributes (718) can be obtained using grammatical or semantic analysis methods described above and disclosed in the referenced disclosures.

FIG. 8 is an expanded version of the system illustrated in FIG. 7. In FIG. 8, additional user interface objects, such as button or check boxes depicted by 815, 816, and 817 are provided to allow the user to further specify the degree of importance or relevance of a particular attribute. For example, button 815 can be used to specify a high degree of importance, button 816 can be used to specify a medium degree of importance, and button 817 can be used to specify a low degree of importance, for a specific attribute. In the same way as is described above, the search engine can re-rank the results based on the degree of importance as specified by the user.

A search system as illustrated above in FIG. 6, FIG. 7 and FIG. 8 with the exemplar use case of resume search can significantly facilitate the search process. Users can find the needed information in a way that can be much faster and more efficient than the conventional search methods.

Specify Importance Values for Files or Folders or Other Objects

In addition to the information objects such as news feeds, emails, and search results, that are generally pushed to the user in time sequence, and from external sources that the user does not have control over which specific object is to be received by the user, the present invention can also be applied to data objects that already exist as collection of objects under the user's control or accessible by the user without having to wait to be received in time sequence.

Such types of objects include documents in a folder or directory, or folders or directories in the hierarchical structure of a file management system, received emails residing in the user's mail box, items in a log file, contact list on the user's social media account, and in the user's computing or communication device, such as smartphone or tablet or notebook or desktop computers. These types of objects are typically displayed in the form of a list.

A common problem in handling such objects is that when the number of objects becomes large, or the list becomes very long, it can be difficult to find the one that is currently needed. Conventional approaches provide sorting or retrieval methods by sorting the list either in alphabetical order, or by other attributes associated with the objects, such as date, time, size, object type, or other metadata. However, when a user has hundreds or even thousands of such objects in the list, the conventional approaches for sorting objects become inadequate.

In contrast, the present invention provides method for the user to specify a granular degree of importance or relevance for an object, such as by attaching a number to the object to indicate the importance or relevance of the object, such that, when displaying the object in the list, the more important objects can be displayed in the top part of the list, thus the user can easily access the object that is currently needed, without going through a long list.

The following is an example with a user's contact list, in either the user's social network, or the user's own computing device.

For example, in a user's contact list, the user can specify which person or contact is of more importance than other persons, and instead of listing the contacts in alphabetic order or other criterion, the system of the present invention can list the contact by importance, either as specified by the user, or by a method that can automatically determine the importance for the user. For example, the system of the present invention can allow the user to specify a number, say 8 on a scale of 1 to 10, for a contact in the list, and 9 for another contact, etc.; and the display the contact list in a sorted order by the importance measure as a default display order.

In addition to displaying the contacts in a single list format when the user accesses the contact list, the system can also determine a threshold number for the importance value, and divide the contacts into separate groups based on whether the importance value is above or below the threshold, and display the groups of different importance in separate display areas or in different display format, as described above in detail with examples of information objects in the feed format.

Some conventional approaches to managing a long list may allow a user to mark an item in the list as important, in contrast to the unmarked ones, thus the list can be sorted by the mark. However, a limitation of the conventional binary approach is that when the list becomes too long or with too many items marked as important, the binary method of marking of an item either as important or not important gradually loses it function in distinguishing important items from unimportant items. With the method of the present invention, a user can mark an item with a numerical value to indicate a much finer-granulated difference in importance, and can change the value as certain items becomes more or less important.

Figure 9:
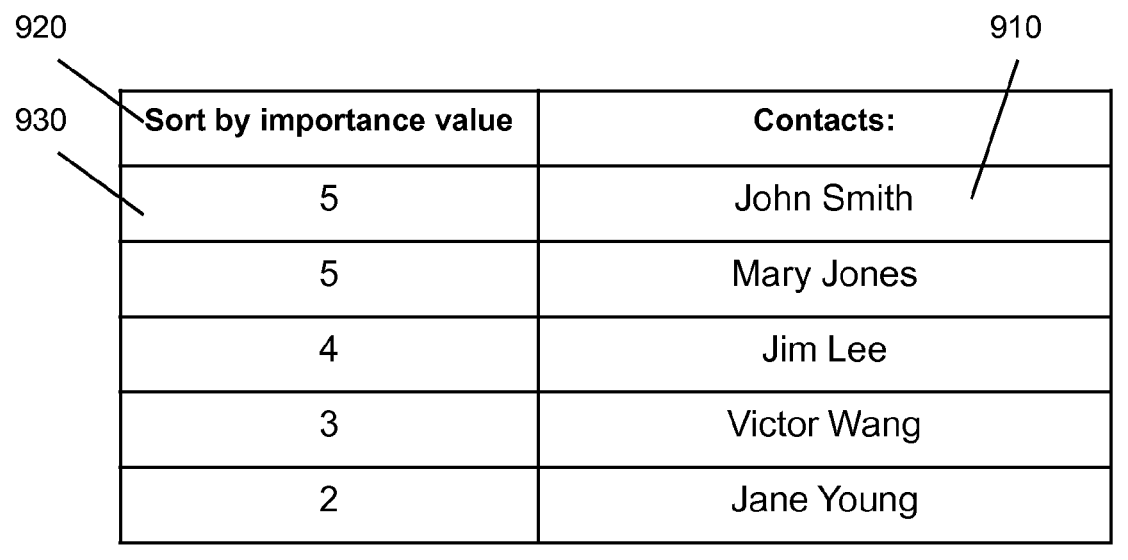

FIG. 9 shows an exemplar user interface for sorting a user's contact list on a social network, or a computer or phone by importance values. A list of contacts (910) are sorted (920) by the importance values (930) assigned by the user.

The same method of allowing the user to specify an importance value for a specific person or contact in the contact collection or address book can also be applied in the same way to objects of other types. For example, in a file or document management tool, user interface objects, such as a text box, one or more buttons, or a slide or scale, can be provided for each file object or folder object in the list, to receive user specification of the importance of the object. And the tool can sort the files or folders by the importance value when displaying the files or sub-folders in a folder.

FIG. 10A shows an exemplar user interface for sorting a user's folders by importance values.

FIG. 10B shows an exemplar user interface for sorting a user's files by importance values.

In addition to the method of specifying an importance value for an object in a collection or a list as exemplified in FIGS. 9, 10A and 10B, other types of user interface objects as illustrated in FIG. 2B and FIG. 2C can also be used for this purpose.

In addition to sorting the items in the list by the importance value, items of different importance can also be displayed in different areas or in different visual formats, as described with examples of message objects in feeds above. Furthermore, files or folders of different importance can automatically be put into different folders or sub-folders, such that the user can browse the file system structure by importance values in addition to the conventional way of browsing by folder names.

In some embodiments, the original files or folders are not moved, only the links to the file or folders are stored in folders labeled as of different importance, and can be browsed as an alternative way to browsing by folder names.

In some embodiments, an attribute or property associated with the object can be identified, and an importance measure can be determined based on the specific attribute, the attribute value or a range of values. An attribute can be a piece of metadata, or a piece of information extracted from the content of the object, such as a specific word or phrase contained in the content of the object. For example, a file or a contact in a contact list can have various types of metadata and values, such as file type, date created, the number of times the file or object is accessed within a given period of time, or the time the object is last accessed, etc.

For a specific attribute, a user interface object, such as a text box or a button, can be provided to receive a user indication about how important an object with this attribute should be. For example, on a scale of 1-5, a user can specify 4 as an importance measure for objects that are accessed within 10 days, and 1 for objects that are accessed 30 days ago. For another example, a user can specify 5 as an importance measure for objects that are most frequently accessed within 10 days, and 3 for objects that are most frequently accessed 20 days ago, etc. For yet another example, a user can specify 5 as an importance measure for objects that contain the term "project", and 3 for objects that contain the term "San Francisco", etc. If an item has multiple attributes, such as being accessed within the last 10 days, and also being the most frequently accessed items in the last 10 days, then a combined importance value can be calculated based on the individual importance values associated with each attribute, and the result can be used for sorting the items.

In some embodiments, especially when an attribute is associated with multiple objects, such as when multiple items are accessed within the last 10 days, or when a number of contacts in the collection have the same area code, or are from the same region or organization, etc., the shared attribute can be identified by the system, and the name or a description of the shared attribute can be presented to the user as a suggestion for grouping or labeling the items. Furthermore, additional user interface objects can be provided for the user to specify an importance value for each group of label.

In addition to the attributes that are generally known as metadata, for certain types of object, such as document or objects that are associated with a text content as a description, or a caption of an image or audio/video objects, etc., content analysis can be performed to identify attributes based on the information contained in the content.

As described in the early part of the present disclosure, a term in a text content, or a term representing a topic in a content, or the class membership of the object, can be identified using methods disclosed in the referenced disclosures by the present inventor. In addition, other types of attributes can also be identified and presented to the user, and be used for organizing the objects.

In U.S. patent application Ser. No. 13/844,143, entitled "Systems, Methods, and User Interface for Effectively Presenting Information", and U.S. provisional patent application 61/805,141, entitled "System, Methods, and User Interface for Presenting Information Based on Document Contents", filed on Mar. 25, 2013, methods and user interface are disclosed for identifying terms associated with certain types of semantic attributes, and for organizing and presenting the information in the content based on such attributes. The disclosures of these patent applications are herein incorporated by reference.

In some embodiments, terms with a certain semantic attribute, such as terms that are names of drugs, or names of persons or companies, or terms that represent phone numbers or web addresses or physical addresses, etc., can be identified as content-based attributes or attribute values based on a content analysis.

When multiple contents share an attribute or attribute value range of such types, a name or a description of such attribute or value range can be presented to the user as a suggestion for grouping or labeling the content, which can be an effective way to organize the otherwise unstructured data.

For example, the system can present an option in a user interface to label or group items in the collection with descriptions such as "group or label by:" and a dropdown list with items such as "contain Web address", "contain physical address", "contain drug names", or "contain phone numbers in the text body", etc. The user can select one or more of such suggested attributes to group or label the objects, such as documents.

In some embodiments, the system can automatically group or label such objects for the user and display the results to the user.

Furthermore, user interface objects can be provided in association with such attributes to allow the user to specify an importance value for one or more of such attributes, or their labels, or the groups, and the system can then sort or organize the items into groups or categories.

In some embodiments, the importance values for different attributes can be predefined in the system and stored in a storage medium as default values, and the system can retrieve such importance values or indications, and if an item has multiple attributes each having an importance value attached, the system can calculate a combined value from the individual values associated with the multiple attributes. Based on the final value, the system can place the object at a position in a list accordingly, or by sorting the list based on the importance value for one or more attributes associated with the objects.

FIG. 11A shows an exemplar user interface for determining an importance measure for an object associated with a specific attribute.

In FIG. 11A, an attribute (1110) can be assigned an importance value (1120), and different attributes can be assigned different values.

In some embodiments, the importance value can be automatically determined based on certain types of attributes, such as the frequency of access to the file or object within a given period of time, or files accessed within a given period of time, etc., as usage patterns The system can assign importance values to a file or folder based on such usage patterns; and the user can sort the file or folder objects by their usage patterns. Furthermore, files or links to files can be put into different containers such as folders based on the usage patterns. For example, files or links to files that are most frequently accessed, or accessed a give number of times within a given period of time, or accessed within a given period of time can be put in a container such as a folder, and the folder can be assigned with different importance values. Such folders can be browsed as an alternative way to browsing by folder names. Conventional approaches related to organizing files or folder objects may record the time of access and display a given number of the most recently accessed files. However, such a method usually displays files in a single list, but does not separate files into different access time periods as being of different importance, or does not let the user specify which time period is more important than others.

FIG. 11B shows an exemplar user interface for re-arranging the files or folder by importance as an alternative way to the conventional method of browsing the file/folder structure by folder names.

In FIG. 11B, files or links to the files of different importance values are stores in respective folders. Folder 1130 determines the importance value of files by frequency of access, and puts the most frequently accessed files in a folder for easy access. Folder 1140 stores the files that have a total access frequency between 5 and 10 times. Folder 1150 stores the files that are marked with an importance value between 4 and 5. Folder 1160 stores the files that are marked with an importance value between 2 and 3. Folder 1170 stores the files that are marked with an importance value of 1.

Folder 1180 stores the files that are accessed within the last 10 days, and folder 1190 stores the files that are accessed within the last 30 days.

Folder 1191 stores the files or emails that contain phone numbers, and folder 1192 stores the files or emails that contain Web addresses.

Each of the folders can further be assigned an importance value. This way, a user can browse the folder structure by importance, and gain an easy and fast access to files of different importance values that are specified by the user or by the system based on the user indication.

As shown in FIG. 19, the same method can also be applied to emails. Conventional email tools allow users to specify an importance by marking an email with a symbol, such as a star. While this feature can be useful in certain cases, the function become less useful when the list of email becomes long, especially the binary marking of whether an email is important or not important. When the list becomes long, sorting by this binary method becomes inadequate in distinguishing which emails are more important that other emails. The present invention provides a user interface object for the user to specify a non-binary value for an item in the list, thus the user can further distinguish which item is more important than another, and when sorting the list, the most important items can be ranked higher than less important items, even when the list becomes long, the user can find the most important items much faster than going through a large number of items that are marked as either important or not important.

The same method can also be applied to other types of objects, such as items in a log file or other types of objects.

The system, methods, and user interface of the present invention can be implemented on a variety of computing devices or network systems.

Figure 12:
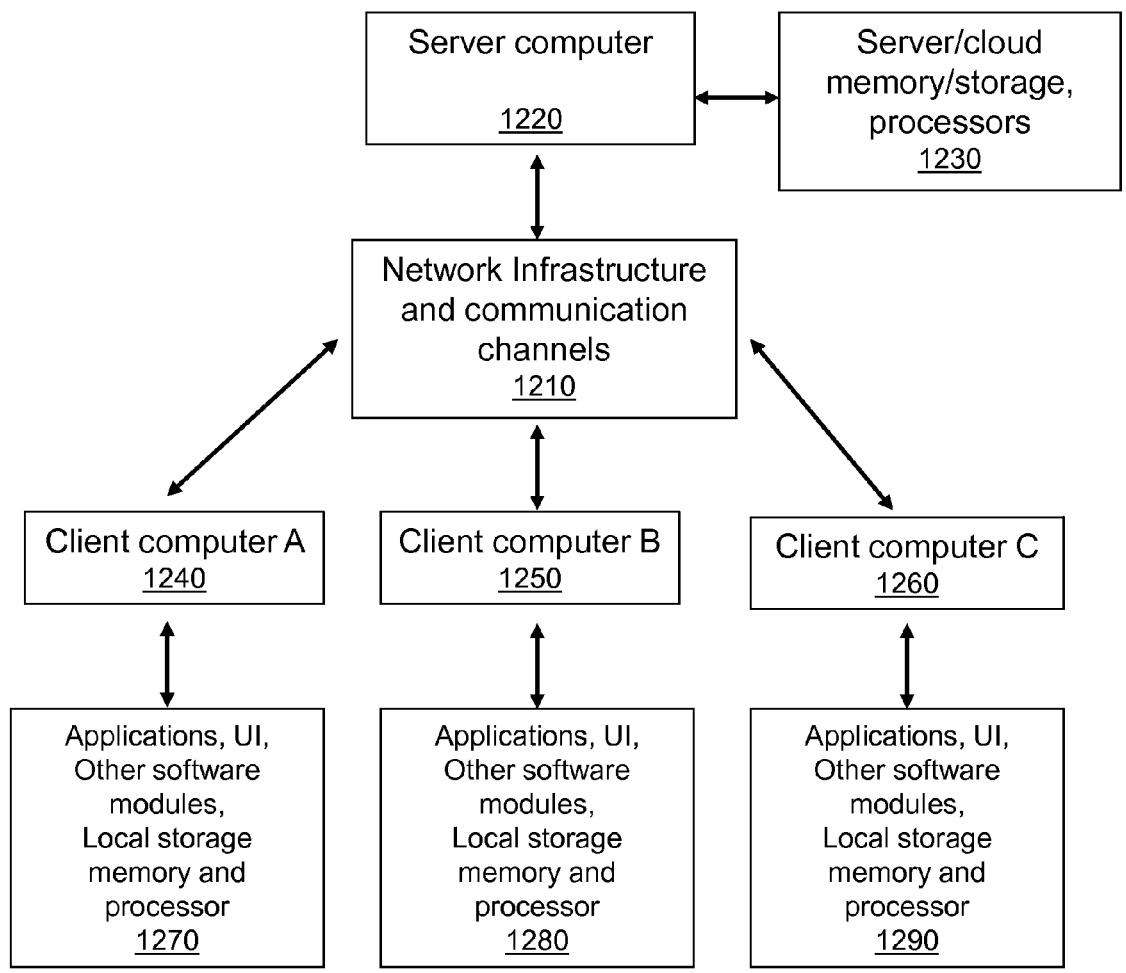
FIG. 12 illustrates the components of a computing system on which the present invention can be implemented.

FIG. 12 is a diagram illustrating a system in the form of a computer network comprising servers, client computers, and related components, where the electronic communications or local operations such as receiving feeds, conducting social network activities, sending and receiving emails, sending search queries and receiving search results, and managing files or folders can be carried out and where the present invention is implemented.

In FIG. 12, one or more of the client computing devices (1240), (1250), and (1260), etc., are connected with each other and with one or more server (1220) computing devices through a network infrastructure and communication channels (1210). The server computing device (1220) is equipped with its own hardware processors and memory modules, and local or cloud-based storage media (1230) which can store the various types of message or information objects, as well as processing software modules. The client computing devices can have their own local storage, as well as memory modules and processors, coupled with various software modules including Web browsers, user interfaces, and text analysis software modules (1270), (1280), and (1290), etc. The server and the client computing devices can be a fixed-location device, a cloud-based device, or a mobile or hand-held device. A user interface device includes devices such as a desktop, laptop, a mobile device with a screen, a television, or any other device with a display.

Messages or information objects including social network news feeds, or emails, as well as search queries can be sent and received by the client computers and displayed in the user interface, or can also be processed on a client computer. Users of the client computing devices can launch software applications to connect to social networks, perform searches and view results, as well as manage local or cloud-based document files or folder through the user interface.

It should be noted that the above are examples only. The system, methods, and user interface illustrated with the specific examples are equally applicable to other types of environments, and other types of documents or message objects, or other areas or domains without deviating from the principle spirit of the present invention.

What is claimed is:

1. A computer-implemented method for presenting information, comprising:
    obtaining a plurality of electronic objects, wherein the electronic objects comprise currently existing files or file folders or directories in a computer file system, contacts in a contact list or address book;
    displaying the electronic objects or their names or icons in a user interface;
    receiving an importance value associated with at least one of the electronic objects, wherein the importance value is entered by a user, wherein the importance value is an element selected from the group consisting at least of a numerical value directly entered by a user, a numerical value transformed from a text specified by a user, a numerical value transformed from a selection of a user interface object indicated by a user;
    determining a position to place the electronic objects or their names or icons in the user interface directly from the importance value; and
    placing the electronic objects or their names or icons in the position in the user interface.

2. The method of claim 1, further comprising:
    sorting the electronic objects based on the importance value.

3. The method of claim 1, further comprising:
    providing a first display area or a first visual format;
    providing a second display area or a second visual format; and
    displaying the electronic objects or links to the electronic objects in the first display area or in the first visual format if the importance measure is above a threshold.

4. The method of claim 3, wherein the first display area or the second display area is associated with a text label representing the meaning of a high importance or a low importance.

5. The method of claim 3, wherein the first display area and the second display area are concurrently visible.

6. The method of claim 1, further comprising:
providing a first container and a second container, wherein the first or the second container includes a folder or directory; and
placing the electronic objects or links to the electronic objects in the first container or in the second container based on the importance value.

7. The method of claim 1, wherein the first container or the second container is associated with a text label representing the meaning of a high importance or a low importance, or an importance value, or a range of importance values.

8. The method of claim 1, wherein the importance value is a non-binary numerical value.

9. A computer-implemented method for presenting information, comprising:
obtaining an electronic object, wherein the electronic object comprises a currently existing file or file folder or directory in a computer file system, a contact in a contact list or address book;
identifying an attribute or attribute value associated with the object, wherein the attribute includes a piece of metadata comprising the number of times the object is accessed within a given period of time, or an attribute obtained from the content of the object, including a specific word or phrase contained in the object, or a class membership of the object, or a specific semantic attribute associated with a word or phrase contained in the object;
displaying a name or description representing the attribute or attribute value in a user interface;
providing an option in the user interface for the object to be associated with an importance value based on the attribute or attribute value;
receiving the importance value specified by a user.

10. The method of claim 9,
wherein the importance value is represented by a text description.

11. The method of claim 9, further comprising:
determining a position to place the electronic object or its name or icon in a user interface based on the importance value; and
placing the electronic object or its name or icon in the position in the user interface.

12. The method of claim 11, wherein the position is a place in a list containing multiple electronic objects, the method further comprising:
sorting the multiple electronic objects in the list based on the importance value.

13. The method of claim 9,
wherein the importance value is a numerical value that is transformed from a text description.

14. The method of claim 9, wherein a plurality of electronic objects are obtained and an importance value is received for each of the plurality of electronic objects, the method further comprising:
providing a user interface object to receive a user indication for grouping or labeling the plurality of electronic objects; and
grouping or labeling the plurality of electronic objects by the importance value.

15. The method of claim 9, wherein a plurality of electronic objects are obtained and an importance value is received for each of the plurality of electronic objects, the method further comprising:
automatically grouping or labeling the plurality of electronic objects by the importance value.

16. The method of claim 15, wherein the importance value is pre-defined and stored.

17. The method of claim 9, wherein the importance value is a non-binary value.

18. A computer-implemented method for presenting information, comprising:
obtaining a plurality of electronic objects comprising multiple files or file folders or directories in a computer file system, multiple contacts in a contact list or address book;
identifying an attribute or attribute value associated with a subset of objects in the plurality of electronic objects, wherein the attribute includes a piece of metadata including the number of times the subset of objects are accessed within a given period of time, or an attribute obtained from the content of the subset of objects, including a specific word or phrase contained in the subset of objects, or a class membership of the subset of objects, or a specific semantic attribute associated with a word or phrase contained in the subset of objects;
displaying a name or description representing the attribute or attribute value in a user interface,
grouping the subset of objects into a group, or labeling the subset of objects with a label based on the attribute or attribute value;
providing an option for the group or label to be associated with an importance value specified by a user;
receiving the importance value specified by a user.

19. The method of claim 18, further comprising:
sorting or organizing the group or label by the importance value.

20. The method of claim 18, wherein the group or label represents a folder or directory.

* * * * *